United States Patent [19]
Sano et al.

[11] Patent Number: 5,503,664
[45] Date of Patent: Apr. 2, 1996

[54] INK COMPOSITIONS FOR INK JET PRINTING

[75] Inventors: Yukari Sano; Junko Shimizu; Hiroko Hayashi; Kiyohiko Takemoto, all of Suwa; Satoru Arata; Issei Kawabata, both of Himeji, all of Japan

[73] Assignee: Seiko Epson Corporation, Tokyo, Japan

[21] Appl. No.: 343,348

[22] Filed: Nov. 22, 1994

Related U.S. Application Data

[63] Continuation-in-part of Ser. No. 227,278, Apr. 13, 1994, abandoned, which is a continuation-in-part of Ser. No. 63,986, May 19, 1993, Pat. No. 5,324,349.

[30] Foreign Application Priority Data

| May 20, 1992 | [JP] | Japan | 4-127365 |
| Nov. 13, 1992 | [JP] | Japan | 4-304065 |
| Nov. 13, 1992 | [JP] | Japan | 4-304066 |
| Nov. 25, 1992 | [JP] | Japan | 4-315344 |

[51] Int. Cl.$^6$ ............................ C09D 11/02; C09D 11/14
[52] U.S. Cl. .................. 106/20 R; 106/25 R; 106/26 R
[58] Field of Search .................. 106/25 R, 20 R, 106/23 F, 26 R

[56] References Cited

U.S. PATENT DOCUMENTS

| 4,882,417 | 4/1989 | Kobayashi et al. | 106/26 R |
| 5,049,188 | 9/1991 | Takimoto et al. | 106/20 R |
| 5,141,558 | 8/1992 | Shirota et al. | 106/20 R |
| 5,156,675 | 10/1992 | Breton et al. | 106/20 D |
| 5,174,815 | 12/1992 | Kondo et al. | 106/20 R |
| 5,180,425 | 1/1993 | Matrick et al. | 106/499 |
| 5,268,027 | 12/1993 | Chan et al. | 106/20 R |
| 5,324,349 | 6/1994 | Sano et al. | 106/25 R |

FOREIGN PATENT DOCUMENTS

| 3529798 | 2/1987 | Germany. |
| 104321 | 9/1978 | Japan. |
| 018472 | 1/1990 | Japan. |

*Primary Examiner*—Helene Klemanski
*Attorney, Agent, or Firm*—Ladas & Parry

[57] ABSTRACT

An ink for ink jet printing comprising a pigment, a component selected from the group consisting of saccharides, derivatives thereof and polyols having 5 or more hydroxyl groups, and a resin emulsion. This pigment-type ink is excellent in preservability, does not cause obstruction in a nozzle, and can evenly produce an image.

27 Claims, No Drawings

INK COMPOSITIONS FOR INK JET PRINTING

This is a continuation-in-part of applications Ser. No. 08/227,278 filed on Apr. 13, 1994 now abandoned which is a continuation-in-part of application Ser. No. 08/063,986 filed May 19, 1993 (now U.S. Pat. No. 5,324,349).

BACKGROUND OF THE INVENTION

1. Field of the Invention

The present invention relates to a pigment-dispersed aqueous ink composition suitable for an ink jet printing system.

2. Related Art

Dye-type ink compositions basically consisting of a dye and an aqueous medium have been known as inks for ink jet printing. It has been pointed out that images produced by the inks of this type are poor in both light resistance and water resistance because of the inherent properties of the dye. In order to solve this problem, inks prepared by using, instead of a dye, a pigment have been proposed.

In the meantime, inks for ink jet printing are required to have the following properties: to undergo no change in the physical properties during long-term preservation; not to cause obstruction in a fine nozzle; to produce sharp images with a high density; and to produce images having high preservability (water resistance, light resistance, etc.). In particular, pigment-type inks are required to have high preservability, i.e., the ability to stably maintain the pigment in a dispersed state for a prolonged period of time, and not to cause obstruction in a nozzle while printing is conducted or when the printer is restarted after interruption of printing.

The following have been proposed as pigment-type inks:

Japanese Patent Publication No. 1426/1987 discloses an ink which is prepared by dispersing a pigment and a resin emulsion in water. According to this, the preservability of a pigment-type ink can be improved by adding thereto an emulsion of a water-insoluble synthetic resin. However, the resin contained in the ink tends to solidify at a nozzle tip to cause obstruction.

Japanese Laid-Open Patent Publication No. 157668/1980 discloses that when a pigment is dispersed in a water-insoluble resin emulsion, the dispersion can be stably maintained even when the viscosity of the dispersion is relatively low. Furthermore, Japanese Laid-Open Patent Publication No. 217088/1989 discloses that the preservability and the fluidity of an ink can be improved by using an emulsion having a specific film-forming temperature. However, even such inks are still insufficient in the stability at low- and high-temperature regions and cause obstruction in a nozzle.

Inks prepared by using a resin emulsion like the above are disclosed also in Japanese Laid-Open Patent Publications Nos. 160068/1991 and 18462/1992. There is however room for further improvement in the stability of these inks.

Japanese Laid-Open Patent publication No. 18427/1990 describes that inositol is added to an ink so that the ink will not cause obstruction in a nozzle. However, since inositol has hygroscopicity, this ink is poor in moisture-abrasion resistance (that is, when the surface of an image produced by this ink is touched by a hand or a finger, the image is abrased, or the hand or the finger is stained with the ink).

It is also pointed out that a pigment-type ink for ink jet printing has the problem of unevenness of printing, which has not been cased by a dye-type ink. Such an unevenness is remarkably found in a solid filled area, like a diagram or a bar graph. To solve the problem of unevenness of printing is an important subject in the art.

We have tried to improved the unevenness of printing by increasing the concentration of pigment in an ink and discharging the ink in excess, but failed. Thus, it seems that the unevenness of printing depends on composition of an ink composition.

SUMMARY OF THE INVENTION

An object of the present invention is to provide a pigment-type ink composition for ink jet printing, which is capable of evenly producing an image, excellent in preservability and does not cause obstruction in a nozzle.

Another object of the present invention is to provide a pigment-type ink composition for ink jet printing, capable of producing an image which has a high optical density and is excellent in rapid drying properties and moisture-abrasion resistance.

We have now surprisingly found that the above object can be attained by adding saccharide or a certain polyol and a resin emulsion to an ink composition.

The ink composition for ink jet printing according to the present invention therefore comprises:

(a) a pigment, (b) a component selected from the group consisting of saccharides, derivatives thereof and polyols having 5 or more hydroxyl groups, and (c) a resin emulsion.

DETAILED DESCRIPTION OF THE INVENTION

Component (a)

Any inorganic or organic pigment can be used, without particular limitation, in the present invention.

Inorganic pigments include for example titanium oxide, iron oxide and carbon black which is produced by a known method such as a contact method, a furnace method or a thermal method. Furthermore, organic pigments include for example azo pigments such as azo lake, water-insoluble azo pigments, condensed azo pigments and chelate azo pigments; polycyclic pigments such as phthalocyanine pigments, perylene pigments, perinone pigments, anthraquinone pigments, quinacrideone pigments, dioxazine pigments, thioindigo pigments, isoindolinone pigments and quinophethalone pigments; dye chelates such as basic dye-type chelates and acidic dye-type chelates; nitro pigments; nitroso pigments and aniline black.

According to the preferred embodiment of the present invention, pigments which have a high affinity for water are preferably used.

The particle diameter of the pigment is preferably 10 μm or less, more preferably 0.1 μor less.

According to the preferred embodiment of the present invention, the component (a) is added to the ink composition in the form of a pigment dispersion obtained by dispersing a pigment in a solvent using a dispersant. Any known polymeric dispersant such as natural polymers and synthetic polymers or surface active agent which has been conventionally used for dispersing a pigment in a pigment-type ink can be favorably used as the dispersant.

Natural polymers include for example proteins such as glue, gelatin, albumin and casein; natural rubbers such as gum arabic and tragacanth gum; glucosides such as saponin;

alginic acid and derivatives thereof such as propylene glycol alginate, triethanol amine alginate and ammonium alginate; and cellulose derivatives such as methyl cellulose, carboxymethyl cellulose, hydroxymethyl cellulose and ethyl hydroxymethyl cellulose.

Synthetic polymers include for example polyvinyl alcohols; polyvinyl pyrrolidones; acrylic resins such as polyacrylic acid, an acrylic acid-acrylonitrile copolymer, a potassium acrylate-acrylonitrile copolymer, a vinyl acetate-acrylic acid ester copolymer and an acrylic acid-acrylic acid alkyl ester copolymer; styrene-acrylic resins such as a stylene-acrylic acid copolymer, a stylene-methacrylic acid copolymer, a stylene-methacrylic acid-acrylic acid alkyl ester copolymer, a stylene-α-methylstylene-acrylic acid copolymer and a stylene-α-methylstylene-acrylic acid-acrylic acid alkyl ester copolymer; a stylene-maleic acid copolymer; a stylene-maleic anhydride copolymer; a vinyl-naphthalene-acrylic acid copolymer; vinyl acetate resin such as a vinyl acetate-ethylene copolymer, a vinyl acetate-fatty acid vinyl ethylene copolymer, a vinyl acetate-maleic acid ester copolymer, a vinyl acetate-crotonic acid copolymer and a vinyl acetate-acrylic acid copolymer; and salts of thereof. Polymers which comprises monomers having a hydrophobic group and monomers having a hydrophilic group and polymers which comprises monomers having a hydrophobic group and a hydrophilic group are preferable. Preferred examples of the salts of these polymers include diethylamine, ammonia, ethylamine, triethylamine, propylamine, isopropylamine, dipropylamine, butylamine, isobutylamine, triethanolamine, diethanolamine, aminomethylpropanol and morpholine. It is preferable that the weight average molecular weight of these copolymers be from 3,000 to 30,000, more preferably from 5,000 to 15,000.

Surface active agents include for example anionic surface active agents such as salts of a fatty acid, higher alkylsulfates, salts of a higher alcohol sulfate ester, condensation products of a higher fatty acid and amino acid, sulfosuccinates, naphthnates, salts of a liquid fatty oil sulfate ester and alkyl allyl sulfate; cationic surface active agents such as salts of fatty amides, quaternary ammonium salts, sulfonium salts and phosphonium; and nonionic surface active agents such as polyoxyethylene alkyl esters, polyoxyethylene alkyl esters, sorbitan alkyl esters and polyoxyethylene sorbitan alkyl esters.

The suitable amount of the dispersant is in the, range of 0.06 to 3 parts by weight, preferably 0.125 to 3 parts by weight based on 1 part of pigment.

Component (b)

Examples of the saccharides which can be used in the ink according to the present invention include monosaccharides, disaccharides, oligosaccharides including trisaccharides and tetrasaccharides, and polysaccharides. Preferred examples of the saccharicle include, glucose, mannose, fructose, ribose, xylose, arabinose, galactose, aldonic acid, glucitol (sorbitol), maltose, cellobiose, lactose, sucrose, trehalose and maltotriose. The term "polysaccharides" herein means sugars in a broader sense, and includes those substances which are widely distributed in the nature, such as alginic acid, α-cyclodextrin and cellulose.

Derivatives of the above saccharides include for example reducing sugars such as sugar-alcohols represented by the general formula of $HOCH_2(CHOH)_nCH_2OH$ in which n is an integer of 2 to 5, and deoxysugars; oxidized sugars such as aldonic acid and uronic acid; dehydrated sugar derivatives such as glycoseen; amino sugars; and thiosugars.

Sugar-alcohols are preferred, and specific examples thereof include maltitol and sorbitol The polyols having 5 or more hydroxyl groups which can be used are hydrocarbons which contain 5 or more, preferably 5 to 12 hydroxyl groups on a cyclic carbon chain. Preferable examples of such hydrocarbons include inositol.

Component (c)

The resin emulsion which can be used is an emulsion-consisting of water as its continuous phase and the following resin component as its disperse phase. The resin component of the disperse phase include for example acrylic resins, vinyl acetate resins, styrene-butadiene resins, vinyl chloride resins, acryl-styrene resins, polybutadiene resin and stylene resin.

According to the preferred embodiment of the present invention, it is preferable that the resin be a polymer having both a hydrophilic moiety and a hydrophobic moiety. Although any particle diameter of the resin component is acceptable as long as an emulsion of the resin can be obtained, a preferable particle diameter is about 150 μm or less, more preferably about 5 μm to 100 μm.

The resin emulsion can be prepared by mixing the resin particles and, if necessary, a surface active agent with water. For instance, an acrylic or styrene-acrylic resin emulsion can be obtained by mixing (meth)acrylate, or styrene and (meth)acrylate, and a surface active agent with water, if necessary, together with (meth)acrylic acid. It is preferable to make the mixing ratio of the resin component to the surface active agent to approximately from 10:1 to 5:1. In the case where the amount of the surface active agent used is less than the above range, it is difficult to obtain an emulsion. On the other hand, when this amount is in excess of the above range, the resulting ink tends to undergo deterioration of water resistance and permeability. Although no particular limitation is imposed on the surface active agent, preferable examples thereof include: anionic surface active agents such as sodium dodecylbenzenesulfonate, sodium laurate, ammonium salts of polyoxyethylene alkyl ether sulfate; and nonionic surface active agents such as polyoxyethylene alkyl ether, polyoxyethylene alkyl ester polyoxyethylene sorbitan fatty acid ester, polyoxyethylene alkylphenyl ether, polyoxyethylene alkylamine polyoxyethylene alkylamide. These surface active agents can be used either singly or as a mixture of two or more.

The suitable proportion of the resin as a component of the disperse phase, and water is such that the amount of water is in the range of 60 to 400 parts by weight, preferably in the range of 100 to 200 parts by weight per 100 parts by weight of the resin.

A conventionally known resin emulsion can be used as the resin emulsion in the present invention. Any one of the resin emulsions described in, for example, Japanese Laid-Open Patent Publication Nos. 1426/1987, 56573/1991, 79678/1991, 160068/1991 and 18462/1992 can be used as it is. These publications are incorporated herein by reference.

A commercially available resin emulsion can also be used as the resin emulsion. Examples of such a resin emulsion include "Microgel E-1002" and "Microgel E-5002" (styrene-acrylic resin emulsions manufactured by Nippon Paint Co., Ltd.), "SEE-9" (a styrene-acrylate resin emulsion manufactured by Nippon Paint Co., Ltd.), "Boncoat 4001" (an acrylic resin emulsion manufactured by Dainippon Ink & Chemicals, Inc.), "Boncoat 5454" (a styrene-acrylic resin emulsion manufactured by Dainippon Ink & Chemicals, Inc.), "AS-467A" (a styrene-acrylic resin emulsion manufactured by Daisel Chemical Industries Co., Ltd.), "SEA 1014" (a styrene-acrylic resin emulsion manufactured by Nippon Zeon Co., Ltd.), "Saibinol SK-200" (an acrylic resin emulsion manufactured by Saiden Chemical Industry Co., Ltd.).

According to the preferred embodiment of the present invention, a resin emulsion having a minimum film-forming temperature (MFT) of 50° C or higher is preferable.

Ink Composition

The ink composition according to the present invention comprises preferably 0.1% to 40% by weight, more preferably 0.5% to 30% by weight of the component (b). When the amount of the component (b) is less than the above range, the effects of the component (b) cannot be obtained. On the other hand, when this amount is in excess of the above range, the component (b) cannot be easily dissolved in water.

The ink composition of the present invention comprises preferably 0.1% to 40% by weight, more preferably 1% to 25% by weight of the resin emulsion. When the amount of the resin emulsion is less than the above range, the effects of the resin emulsion cannot be expected. On the other hand, when this amount is in excess of the above range, the resulting ink composition cannot produce an image with a high optical density, and tends to have an excessively high viscosity.

The amount of the pigment in the ink composition is preferably about 0.5% to 25% by weight, more preferably about 2% to 15% by weight.

The ink composition according to the present invention forms an extremely thin and brittle film at a nozzle tip. This film prevents evaporation of water and organic solvent from the ink composition, so that the solid components are not separated out. The ink composition is thus prevented from causing obstruction in a nozzle. On the other hand, this film is so thin and brittle that it can be readily broken by a usual cleaning operation (reset operation). It is therefore possible to initiate printing right after this operation. The ink composition of the present invention can produce a high-density image having high moisture-abrasion resistance. Without intending to be bound by theory, it is believed that the apparent diameter of the pigment particles is increased by adsorption of the resin emulsion and the component (b), so that the pigment cannot easily permeate the fibers of paper. Thus, the permeability of the ink is moderated, and the pigment particles are fully sustained on the fibers of paper. What is more interesting is that the ink composition of the present invention is excellent in preservability. It can be considered that the dispersion stability of the pigment particles is enhanced by the adsorption of the resin emulsion and the component (b) to the pigment particles.

According to the preferred embodiment of the present invention, the weight ratio of the resin emulsion: the component (b) in the ink composition of the invention is preferably 1:0.5 or more but less than 1:50, more preferably in the range of 1:0.5 to 1:40. The above-described advantageous properties of the ink composition according to the present invention can be enhanced by employing this weight ratio and adding the resin emulsion having a minimum film-forming temperature of 50° C or higher in combination.

According to the preferred embodiment of the present invention, the ink comprises the pigment, the component (b), and the resin emulsion in the following proportion: the weight ratio of the pigment: the resin component of the resin emulsion is preferably in the range of 1:0.1 to 1:2, more preferably in the range of 1:0.1 to 1:1.5, and the weight ratio of the component (b): the total amount of the pigment and the resin component of the resin emulsion is preferably in the range of 1:0.1 to 1:2, more preferably in the range of 1:0.18 to 1:2.

According to the preferred embodiment of the present invention, it is preferable that the ink composition of the present invention further comprise a wetting agent.

The wetting agents include for example diethylene glycol, polyethylene glycol, polypropylene glycol, ethylene glycol, propylene glycol, butylene glycol, triethylene glycol, 1,2,6-hexanetriol, thioglycol, hexylene glycol, glycerine, trimethylolethane, trimethylolpropane, urea, 2-pyrrolidone, N-methyl-2pyrrolidone and 1,3-dimethyl-2-imidazolidinone. The wetting agents having an ethylene oxide group are particularly preferred, and diethylene glycol is most preferred. In addition to the wetting agent, it is preferable to further add an organic solvent having a low boiling point. Preferred examples of such an organic solvent include methanol, ethanol, n-propanol, iso-propanol, n-butanol, sec-butanol, tert-butanol, iso-butanol, n-pentanol, ethylene glycol monomethyl ether, ethylene glycol monoethyl ether, diethylene glycol monomethyl ether, diethylene glycol monoethyl ether, triethylene glycol monomethyl ether and triethylene glycol monoethyl ether. Monovalent alcohols are particularly preferred.

The amount of the wetting agent is preferably in the range of 0.5% to 40% by weight, more preferably 2% to 20% by weight of the ink composition. The amount of the organic solvent having a low boiling point is preferably in the range of 0.5% to 10% by weight, more preferably 1.5% to 6% by weight of the ink composition.

According to the preferred embodiment of the present invention, it is preferable that the weight ratio of the total amount of the pigment and the resin component of the resin emulsion: the dispersant be from 1:0.02 to 1:0.5, and the weight ratio of the dispersant: the component (b) be from 1:0.5 to 1:50.

It can be considered that the resin emulsion also acts as a dispersant. It is therefore possible to further add the resin emulsion instead of adding the dispersant.

The ink composition can contain an optional additives in order to improve the properties of the ink composition. Specific examples of such additives include a viscosity modifier, a surface tension modifier, a pH adjustor, an antifungal agent and a preservative.

The ink composition according to the present invention can be prepared by dispersing and mixing the above-described components by a proper method. A preferable manner is such that the components except an organic solvent and a volatile component are mixed in a proper dispersion mixer such as a ball mill, a sand mill, an atrittor, a roll mill, an agitator mill, a Henschel mixer, a colloid mill, an ultrasonic homogenizer, a jet mill, an angmill, to obtain a homogeneous composition, and an organic solvent and a volatile component are then added to this composition. It is preferable to subject the mixture thus obtained to filtration, preferably filtration using a metal filter, a membrane filter or the like under reduced pressure or under pressure, or centrifugal separation in order to remove large particles and foreign matters which tend to be a cause of obstruction in a nozzle.

The present invention will now be explained more specifically by referring to the following Examples, which should not be construed as limiting the present invention.

In the following examples, "MFT" denotes a minimum film-forming temperature, and percentages are by weight.

EXAMPLE 1

| | |
|---|---|
| Carbon black MA7 (manufactured by Mitsubishi Chemical Industries, Ltd.) | 2% |
| Styrene-maleic anhydride copolymer | 4% |

| (dispersant) | |
|---|---|
| Microgel E-1002 | 25% |
| (Styrene-acrylic resin emulsion, resin content: 19.9%, MFT = about 80° C., manufactured by Nippon Paint Co., Ltd.) | |
| α-Cyclodextrin | 14% |
| Diethylene glycol | 5% |
| Ethanol | 5% |
| Pure water | 45% |

The above components except diethylene glycol and ethanol were mixed, and the mixture was dispersed in a sand mill (manufactured by Yasukawa Seisaku-sho K.K.) along with glass beads (diameter: 1.7 mm, 1.5 times (w/w) the quantity of the mixture) for two hours. Thereafter, the glass beads were removed, and diethylene glycol and ethanol were added to the mixture. The resulting mixture was stirred at room temperature for 20 minutes, and then filtered through a 5-μm membrane filter, whereby an ink for ink jet printing was obtained.

EXAMPLE 2

| Carbon black MA100 | 3% |
|---|---|
| (manufactured by Mitsubishi Chemical Industries, Ltd.) | |
| Polyvinyl alcohol | 0.5% |
| (dispersant) | |
| Boncoat 4001 | 2% |
| (acrylic resin emulsion, resin content: 50%, MFT = 5° C., manufactured by Dainippon Ink & Chemicals, Inc.) | |
| Sucrose | 15% |
| Glycerine | 10% |
| n-Propanol | 2% |
| Pure water | 67.2% |

The above components except glycerine and n-propanol were mixed, and the mixture was dispersed in a sand mill (manufactured by Yasukawa Seisaku-sho K. K.) along with zirconium beads (diameter: 1.2 mm, 0.8 times (w/w) the quantity of the mixture) for two hours. Thereafter, the beads were removed, and glycerine and n-propanol were added to the mixture. The resulting mixture was stirred at room temperature for 20 minutes, and then filtered through a 5-μm membrane filter, whereby an ink for ink jet printing was obtained.

EXAMPLE 3

| Carbon black #40 | 2.5% |
|---|---|
| (manufactured by Mitsubishi Chemical Industries, Ltd.) | |
| Styrene-acrylic acid copolymer | 2% |
| (dispersant) | |
| Microgel E-5002 | 0.85% |
| (Styrene-acrylic resin emulsion, resin content: 29.2%, MFT = 80° C., manufactured by Nippon Paint Co., Ltd.) | |
| Inositol | 10% |
| 2-Pyrrolidone | 4% |
| Ethanol | 5% |
| Pure water | 75.65% |

The above components except 2-pyrrolidone and ethanol were mixed, and the mixture was dispersed in a sand mill (manufactured by Yasukawa Seisaku-sho K.K.) along with glass beads (diameter: 1.0 mm, 1.2 times (w/w) the quantity of the mixture) for two hours. Thereafter, the glass beads were removed, and 2-pyrrolidone and ethanol were added to the mixture. The resulting mixture was stirred at room temperature for 20 minutes, and then filtered through a 5-μm membrane filter, whereby an ink for ink jet printing was obtained.

EXAMPLE 4

| C.I. Pigment black 1 | 5% |
|---|---|
| Polyvinylpyrrolidone | 1% |
| (dispersant) | |
| Boncoat 5454 | 15% |
| (styrene-acrylic resin emulsion, resin content: 45%, MFT = 4° C., manufactured by Dainippon Ink & Chemical, Inc.) | |
| Xylose | 6% |
| Glycerine | 10% |
| n-Propanol | 4% |
| Pure water | 59% |

The above components except glycerine and n-propanol were mixed, and the resulting mixture was dispersed in a sand mill (manufactured by Yasukawa Seisaku-sho K.K.) along with glass beads (diameter: 1.7 mm, 1.5 times (w/w) the quantity of the mixture) for two hours. Thereafter, the glass beads were removed, and glycerine and n-propanol were added to the mixture. The resulting mixture was stirred at room temperature for 20 minutes, and then filtered through a 5-μm membrane filter, whereby an ink for ink jet printing was obtained.

EXAMPLE 5

| Carbon black MA7 | 2% |
|---|---|
| Styrene-acrylic acid copolymer | 0.8% |
| (dispersant) | |
| Microgel E-1002 | 3% |
| Sucrose | 5.6% |
| Diethylene glycol | 5% |
| Ethanol | 5% |
| Pure water | 78.6% |

The above components except diethylene glycol and ethanol were mixed, and the mixture was dispersed in a sand mill (manufactured by Yasukawa Seisaku-sho K.K.) along with glass beads (diameter: 1.7 mm, 1.5 times (w/w) the quantity of the mixture) for two hours. Thereafter, the glass beads were removed, and diethylene glycol and ethanol were added to the mixture. The resulting mixture was stirred at room temperature for 20 minutes, and then filtered through a 5-μm membrane filter whereby an ink for ink jet printing was obtained.

EXAMPLE 6

| Carbon black MA100 | 3% |
|---|---|
| Polyvinyl alcohol | 0.5% |
| (dispersant) | |
| SAE 1014 | |
| (Styrene-acrylic resin emulsion, resin content: 40%, MFT = 70–90° C. manufactured by Nippon Zeon Co., Ltd.) | |
| Sorbitol | 5% |
| Glycerine | 10% |
| n-Propanol | 2% |
| Pure water | 69.5% |

The above components except glycerine and n-propanol were mixed, and the mixture was dispersed in a sand mill (manufactured by Yasukawa Seisaku-sho K.K.) along with glass beads (diameter: 1.2 mm, 0.8 times (w/w) the quantity of the mixture) for two hours. Thereafter, the glass beads were removed, and glycerine and n-propanol were added to the mixture. The resulting mixture was stirred at room temperature for 20 minutes, and then filtered through a 5-μm membrane filter, whereby an ink for ink jet printing was obtained.

EXAMPLE 7

| | |
|---|---|
| Carbon black Raven 1080 (available from Columbian Carbon Japan Limited) | 2.4% |
| Styrene-maleic anhydride copolymer (dispersant) | 0.5% |
| Saibinol SK-200 (acrylic resin emulsion, resin content: 49.5%, MFT >80° C., manufactured by Saiden Chemical Industry Co., Ltd.) | 0.88% |
| Maltotriose | 15% |
| Urea | 4% |
| Ethanol | 5% |
| Pure water | 72.22% |

The above components except urea and ethanol were mixed, and the mixture was dispersed in a sand mill (manufactured by Yasukawa Seisaku-sho K.K.) along with glass beads (diameter: 1.0 mm, 1.2 times (w/w) the quantity of the mixture) for two hours. Thereafter, the glass beads were removed, and urea and ethanol were added to the mixture. The resulting mixture was stirred at room temperature for 20 minutes, and then filtered through a 5-μm membrane filter, whereby an ink for ink jet printing was obtained.

EXAMPLE 8

| | |
|---|---|
| C.I. Pigment black 1 | 8% |
| Polyvinylpyrrolidone (dispersant) | 1% |
| Boncoat 5454 | 5% |
| Maltitol | 10% |
| 1,5-Pentanediol | 10% |
| n-Propanol | 4% |
| Pure water | 62% |

The above components except 1,5-pentanediol and n-propanol were mixed, and the mixture was dispersed in a sand mill (manufactured by Yasukawa Seisaku-sho K.K.) along with glass beads (diameter: 1.7 mm, 1.5 times (w/w) the quantity of the mixture) for two hours. Thereafter, the glass beads were removed, and 1,5-pentanediol and n-propanol were added to the mixture. The resulting mixture was stirred at room temperature for 20 minutes, and then filtered through a 5-μm membrane filter, whereby an ink for ink jet printing was obtained.

EXAMPLE 9

| | |
|---|---|
| Carbon black MA100 | 5% |
| Potassium acrylate-acrylonitrile copolymer (dispersant) | 1% |
| Microgel E-1002 | 4% |
| Sucrose | 8% |
| Glycerine | 8% |
| Ethanol | 6% |
| Pure water | 68% |

The above components were mixed by a jet mill. It was confirmed by microscopic observation that the particle diameters were within the range of 1 μm or less. The mixture was filtered through a 3-μm membrane filter under pressure, whereby an ink for ink jet printing was obtained.

In the following Examples 10 to 13, inks for ink jet printing were respectively prepared in the same manner as in Example 9.

EXAMPLE 10

| | |
|---|---|
| Carbon black MA100 | 4% |
| Styrene-acrylic acid copolymer (dispersant) | 1.2% |
| Microgel E-1002 | 8% |
| α-Cyclodextrin | 3% |
| Diethylene glycol | 12% |
| 2-Propanol | 3% |
| Pure water | 68.8% |

EXAMPLE 11

| | |
|---|---|
| Carbon black MA7 | 2% |
| Styrene-maleic acid copolymer (dispersant) | 0.5% |
| SG-60 (Styrene-acrylic resin emulsion, resin content: 41%, MFT = 92° C., manufactured by Gifu Shellac Mfg. Co., Ltd.) | 1.2% |
| Sucrose | 10% |
| Urea | 2% |
| 2-Propanol | 5% |
| Pure water | 79.3% |

EXAMPLE 12

| | |
|---|---|
| Carbon black MA7 | 2% |
| Styrene-maleic acid copolymer (dispersant) | 5% |
| Polyvinylpyrrolidone (dispersant, average molecular weight: about 40,000, manufactured by Tokyo Kasei Kogyo Co., Ltd.) | 1% |
| SEE-9 (Styrene-acrylate resin emulsion resin content: 40%, MFT = 50–80° C., manufactured by Nippon Paint Co., Ltd.) | 7.5% |
| Xylose | 1.5% |
| Polyethylene glycol | 8% |
| Ethanol | 4% |
| Pure water | 71% |

EXAMPLE 13

| | |
|---|---|
| Pigment KET Red 309 (manufactured by Dainippon Ink & Chemicals, Inc. | 3% |
| Potassium acrylate-acrylonitrile copolymer (dispersant) | 0.5% |
| Denka Poval (dispersant, manufactured by by Denki Kagaku Kogyo K.K.) | 1% |
| AS-467A | 4.3% |

| | |
|---|---|
| (Stylene-acrylic acid resin emulsion, resin content: 46%, MFT = 70–90° C., manufactured by Daisel Chemical Industries Co., Ltd.) | |
| Inositol | 10% |
| Diethylene glycol | 5% |
| 1-Propanol | 5% |
| Pure water | 71.2% |

EXAMPLE 14

| | |
|---|---|
| Carbon black MA100 | 2% |
| Salt of acrylic acid- acrylonitrile copolymer (dispersant) | 0.2% |
| Microgel E-1002 | 2.5% |
| Maltose | 1.2% |
| Diethylene glycol | 5% |
| Ethanol | 3% |
| Pure water | 86.1% |

The above components were mixed by a jet mill. It was confirmed by microscopic observation that the particle diameters were within the range of 1 μm or less. The mixture was filtered through a 3-μm membrane filter under pressure, whereby an ink for ink jet printing was obtained.

In the following Examples 15 to 21, inks for ink jet printing were respectively prepared in the same manner as in Example 14.

EXAMPLE 15

| | |
|---|---|
| Carbon black MCF-88 (manufactured by Mitsubishi Chemical Industries, Ltd.) | 5% |
| Salt of acrylic acid- acrylonitrile copolymer (dispersant) | 2.2% |
| SEE-9 | 0.75% |
| Inositol | 3% |
| Ethylene glycol | 5% |
| I-Propanol | 1% |
| Urea | 1% |
| Pure water | 82.05% |

EXAMPLE 16

| | |
|---|---|
| Carbon black MA7 | 4% |
| Polyvinylpyrrolidone (dispersant, average molecular weight: about 40,000, manufactured by Tokyo Kasei Kogyo Co., Ltd.) | 0.8% |
| Microgel E-1002 | 15.1% |
| Sucrose | 4% |
| Urea | 2.2% |
| 2-Propanol | 2% |
| Pure water | 71.9% |

EXAMPLE 17

| | |
|---|---|
| Carbon black Raven 150 (available from Columbian Carbon Japan Limited) | 3% |
| Salt of styrene-acrylic acid copolymer (dispersant) | 0.18% |
| SG-60 | 7.3% |
| Sorbitol | 2% |
| Urea | 3% |
| Glycerine | 5% |
| 1-Butanol | 0.5% |
| Pure water | 79.02% |

EXAMPLE 18

| | |
|---|---|
| Pigment KET BLUE EX-1 (manufactured by Dainippon Ink & Chemicals Inc.) | 5% |
| Salt of styrene-acrylic acid copolymer (dispersant) | 1% |
| Microgel E-1002 | 1.5% |
| Galactose | 2% |
| Sucrose | 7.5% |
| Diethylene glycol | 5% |
| Ethanol | 4% |
| Pure Water | 74% |

EXAMPLE 19

| | |
|---|---|
| Pigment KET YELLOW 403 (manufactured by Dainippon Ink & Chemicals, Inc.) | 3% |
| Salt of styrene-acrylic acid copolymer (dispersant) | 0.4% |
| SAE 1014 | 5% |
| Maltitol | 0.5% |
| Alginic acid | 0.5% |
| Urea | 2% |
| Diethylene glycol | 5% |
| Ethanol | 2% |
| Pure Water | 81.6% |

EXAMPLE 20

| | |
|---|---|
| Carbon black MA7 | 4% |
| Salt of styrene-acrylic acid copolymer (dispersant) | 0.8% |
| Saibinol SK-200 | 1.2% |
| Glucose | 12% |
| Thiourea | 2% |
| Ethanol | 3% |
| Pure Water | 77% |

EXAMPLE 21

| | |
|---|---|
| Carbon black MA7 | 4% |
| Salt of styrene-acrylic acid copolymer (dispersant) | 0.8% |
| Microgel E1002 | 3% |
| SAE1014 | 1.3% |
| Maltitol | 4.2% |
| Urea | 3% |
| Diethylene glycol | 5% |
| Ethanol | 1.5% |
| Pure Water | 77.2% |

EXAMPLE 22

| | |
|---|---|
| Carbon black MA7 | 5% |
| Ammonium salt of styrene- acrylic acid copolymer (dispersant) | 1% |
| Maltitol | 7% |
| SG-60 | 3.6% |

-continued

| Ethanol | 3.5% |
|---|---|
| Urea | 10% |
| 2-Pyrrolidone | 2% |
| Pure Water | 67.9% |

EXAMPLE 23

| Carbon black MA7 | 6% |
|---|---|
| Ammonium salt of styrene-acrylic acid copolymer (dispersant) | 1.2% |
| Glucose | 7% |
| GRANDOLL PP-1000 (Styrene-acrylic resin emulsion, resin content: 45%, MFT = 100° C. or more, manufactured by Dainippon Ink & Chemicals, Inc.) | 3.3% |
| Ethanol | 3.5% |
| Urea | 10% |
| 2-Pyrrolidone | 2% |
| Pure water | 67.0% |

EXAMPLE 24

| Carbon black MA7 | 5% |
|---|---|
| Ammonium salt of styrene-acrylic acid copolymer (dispersant) | 1% |
| Glucose | 2% |
| Maltitol | 5% |
| Microgel E-2002 (Methyl (meth)acrylate resin emulsion, resin content: 33%, MFT = 100° C. or more, manufactured by Nippon Paint Co., Ltd.) | 3.6% |
| Ethanol | 4% |
| 1,3-dimethyl-2-imidazolidinone | 1.5% |
| Trymethylolpropane | 8% |
| Pure Water | 69.9% |

EXAMPLE 25

| Carbon black MA7 | 5% |
|---|---|
| Ammonium salt of styrene-acrylic acid copolymer (dispersant) | 1% |
| Maltitol | 5% |
| Microgel E-2002 | 3.6% |
| Ethanol | 2% |
| Urea | 8% |
| 1,3-dimethyl-2-imidazolidinone | 2% |
| Pure Water | 73.4% |

EXAMPLE 26

| Pigment KET RED 309 | 5% |
|---|---|
| Ammonium salt of styrene-acrylic acid copolymer (dispersant) | 1% |
| Maltitol | 7% |
| GRANDOLL PP-1000 | 3.3% |
| Ethanol | 3.5% |
| Urea | 10% |
| 2-Pyrrolidone | 2% |
| Pure Water | 68.2% |

Comparative Example 1

| Carbon black MA100 | 10% |
|---|---|
| Gelatin (dispersant) | 4% |
| Inositol | 7% |
| Ethylene glycol | 15% |
| Ethanolamine | 1% |
| Pure water | 60% |

The above component were mixed, and the mixture was dispersed in a sand mill (manufacture by Yasukawa Seisakusho K.K.) along with glass beads (diameter: 1.0 mm, 1.2 times (w/w) the quantity of the mixture) for two hours. The resulting mixture was then filtered through a 5-μm membrane filter, whereby an ink for ink jet printing was obtained.

The following Comparative Examples 2 and 3 were respectively prepared the same manner as in Comparative Example 1.

Comparative Example 2

| C.I. Pigment black 1 | 8% |
|---|---|
| Lunox 1500A (anionic surface active agent manufactured by Toho Chemical Industry Co., Ltd.) | 3.4% |
| Lunal 310 (anionic surface active agent manufactured by Toho Chemical Industry Co., Ltd.) | 1% |
| Primal AC-61 (acrylic resin emulsion, resin content: 46%, MFT = 17° C., manufactured by Japan Acrylic Chemical Co., Ltd.) | 18% |
| Ethylene glycol | 7% |
| Pure water | 62.6% |

Comparative Example 3

| Carbon black MA7 | 3% |
|---|---|
| Salt of styrene-maleic anhydride copolymer (dispersant) | 0.1% |
| Microgel E1002 | 15% |
| Polyethylene glycol | 4.5% |
| Urea | 7% |
| 1-Propanol | 3% |
| Pure water | 67.4% |

Evaluation Test

The properties of the above ink compositions were evaluated in the following manner:

(a) Obstruction

The ink composition was placed in an ink jet printer HG-5130 (manufactured by Seiko Epson Corporation). After an image was continuously printed by the printer for 10 minutes, the printing was discontinued. The printer was then allowed to stand without covering its head with a cap in an environment of 40° C. and 25% RH for two weeks when the ink was one of those obtained in Examples 1–8 and Comparative Examples 1 and 2, and at room temperature for 1 day when the ink was one of those obtained in Examples 9–21 and Comparative Examples 3. After the nozzle was subjected to a cleaning operation, printing was initiated. The obstruction property of the ink was evaluated by the number of times of the cleaning operation necessary to obtain an image equal to the initially obtained one, which was free from defects such as tailings and voids.

The results are as shown in the tables below. In the tables,

A: an image equal to the initially obtained one was obtained after the cleaning operation was repeated 0 to 5 times;

B: an image equal to the initially obtained one was obtained after the cleaning operation was repeated 6 to 10 times; and C: an image equal to the initially obtained one was obtained even after the cleaning operation was repeated 11 times or more.

(b) Preservability

A laboran screw tube bottle was filled with 50 cc of the ink, and allowed to stand at a temperature of 50° C. when the ink was one of those obtained in Examples 1–8 and Comparative Examples 1 and 2, and at temperatures of both −20° C. and 50° C. when the ink was one of those obtained in Examples 9–21 and Comparative Examples 3. After two months, the presence of precipitate in the ink was observed.

The results are as shown in the tables below. In the tables, regarding the inks of Examples 1–8 and Comparative Examples 1 and 2.

A: no precipitate was found, and

C: precipitate was found, and regarding the inks of Examples 9–21 and Comparative Examples 3

A: no precipitate was found in both of the inks preserved at −20° C. and 50° C.

B: precipitate was found only in the ink preserved at −20° C., and

C: precipitate was found in both of the inks preserved at −20° C. and 50° C.

(c) Water Resistance

An image was printed on a sheet of "Xerox P Pager" (Trademark, manufactured by Xerox Corp.) by an ink jet printer HG-5130. This out put sample was air-dried for 24 hours, and then immersed in 100 cc of water. The change in the optical density of the printed image before and after the immersion was determined by a Macbeth PCM II (manufactured by Macbeth Corp.).

The results are as shown in the tables below. In the tables,

A: the change in the OD value before and after the immersion was 0.5 or less,

B: the change in the OD value before and after the immersion was from 0.5 to 1.0, and B: the change in the OD value before and after the immersion was 1.0 or more.

(d) Resistance to Finger Abrasion

An image was printed on a sheet of "Xerox P Paper" (Trademark, manufactured by Xerox Corp.) by an ink jet printer HG-5130. After being air-dried for 24 hours, the out put sample was rubbed by fingers in an environment of 5° C. and 50% RH, and visually observed whether the image was smudged or not.

The results are as shown in the tables below. In the tables,

A: no smudge was observed in the printed image,

B: smudge was slightly observed in the printed image, but the characters were able to be read, and C: the printed image was so smudged that the characters were not able to be read.

(e) Light Resistance

An image was printed on a sheet of "Xerox P pager" (Trademark, manufactured by Xerox Corp.) by an ink jet printer HG-5130, and this out put sample was air-dried for 24 hours. Light was then irradiated to the sample by a xenon fade tester XF-15N (manufactured by Shimadzu Corp.) at 70% RH for 50 hours. The change in the $L^*a^*b$ color difference before and after the irradiation was determined by a differential colorimeter CR-121 (manufactured by Minolta Co., Ltd.).

The results are as shown in the tables below. In the tables,

A: $\Delta E \leq 10$, and

C: $\Delta E > 10$ (f) Image Quantity (Blur)

An image was printed by an ink jet printer HG-5130 on each one of the following- papers: "Xerox P Paper" (Trademark, manufactured by Xerox Corp.), "Ricopy 6000 Paper" (Trademark, manufactured by Ricoh Co., Ltd.), "Xerox 4024 Paper" (Trademark, manufactured by Xerox Corp.), and "Neenah Bond Paper" (Trademark, manufactured by Kimberly-Clark Corporation). The image was visually observed whether it was blurred or not.

The results are as shown in the tables below. In the tables.

A: the printed image was sharp and free from blur,

B: the printed image was blurred like whiskers, and

C: the printed image was so blurred that the characters had fuzzy outlines.

(g) Image Quality (Optical Density)

The reflection optical density of the printed image obtained in the above item "Image Quality (Blur)" was measured by a Macbeth OCMII.

The results are as shown in the tables below.

(h) Rapid Drying Properties

100% Duty printing was conducted by an ink jet printer HG-5130 on four types of papers which were the same as those used in the above item "Image Quality (Blur)". The rapid drying properties of the ink were evaluated by the time required to dry up the printed image to such a degree that a hand was not stained with the ink upon touching the printed image.

The results are as shown in the tables below. In the tables,

A: the time was within 30 seconds, and

C: the time was more than 30 seconds.

(i) Unevenness of Printing

100% Duty printing was conduced on "Ricopy 6000 paper" (Trademark, manufactured by Ricoh Co., Ltd.) and "Canon Dry Paper" (Trademark, manufactured by Canon Inc.) by an ink jet printer HG-5130. The OD values of any five points on the printed image were measured with Macbeth PCMII, and then the average of the five values is obtained. This procedure was repeated five times to give five average values. The difference between the maximum average value and minimum average value was obtained.

The results are as shown in the tables below. In the tables,

A: the difference was 0.4 or less, i.e., unevenness was not virtually found in the printed image, B: the difference was 0.4 to 0.5, i.e. unevenness raised no practical problem, and C: the difference was more than 0.5, i.e. unevenness made the image no practical value.

(j) Intermittent Jetting Stability

The ink composition was charged in an ink jet printer MJ-500 (manufactured by Seiko Epson Corporation) placed in an environment of the room temperature and 50% RH. Printing was performed per five-minutes interval. The intermittent jetting stability was measured by the time from the initial printing required to observe the first occurrence of deviation from ink path. The results are shown in the table below. In the table, AA: the time was 30 seconds or more, A: the time was from 20 to less then 30 seconds, B: the time was from 15 to less than 20 seconds, C: the time was from 10 to less than 15 seconds, and D: the time was less than 10 seconds.

Grades AA to C are acceptable for practical use.

(k) Color production

A 100%-duty print image (3×3 cm) was formed on neutral paper (Conqueror (100g/m$^2$): neutral paper manufactured by Arjo Widding) and acid pater (Neehah Bond :acid paper manufactured by Kimberly-Clark). The printing was performed using an experimental 48-nozzle ink jet printer under conditions of a jetting nozzle diameter of 30 μm, a piezoelectric element drive voltage of 20 V, a drive frequency of 5.5 kHz, a resolution of 360 dots/inch and an amount of ink jetted of 0.08 μg/dot.

The color production of the solid prints was evaluated in terms of the color difference between the measured value and the color tone standard value specified in CIE (Commission International de l'Eclairage). The color difference was measured with a Macbeth CE-7000 spectrophotometer manufactured by Macbeth. The color difference between the measured value and the color tone standard value was determined by the following equation:

$$\Delta E^*ab = [(\Delta L^*)^2 + (\Delta a^*)^2 + (\Delta b^*)^2]^{1/2}$$

The color differences are shown in the following table.

| Example | 18 | 19 | 26 |
| --- | --- | --- | --- |
| Color Production | A | A | A |
| Color Mixing Printing | A | A | A |

In the table,

A: the color difference $\Delta E^*ab$ was less than 5; and

B: the color difference $\Delta E^*ab$ was not less than 5.

(1) Color mixing printing

A 100%-duty printing of a color ink composition was formed. Then, alphabets were printed using a black ink on the 100%-duty printing previously formed. The boundary between the black print and the color print was observed with the naked eye. The recording paper and recording conditions are the same as that of (k) Color-production.

The combination of a color ink and black ink and the results are shown in the table below. In the table, A: Neither bleeding nor feathering derived from color mixing was substantially observed;

B: Bleeding and/or feathering derived from color mixing was slightly observed;

C: Bleeding and/or feathering derived from color mixing were somewhat observed in some combinations depending upon types of paper; and D: Bleeding and/or feathering derived from color mixing were observed in all types of paper.

| Color Ink | Black Ink | Results |
| --- | --- | --- |
| Example 18 | Example 22 | A |
| Example 19 | Example 22 | A |
| Example 26 | Example 22 | A |

TABLE

| Example | 1 | 2 | 3 | 4 |
| --- | --- | --- | --- | --- |
| Resin component of resin emulsion: Component (b) | 2.8 | 15 | 40.3 | 0.89 |
| Pigment: Resin component of resin emulsion 1 | 2.5 | 0.33 | 0.1 | 1.35 |
| Component (b): Pigment + Resin component of resin emulsion | 0.5 | 0.27 | 0.275 | 1.96 |
| (a) Obstruction | A | A | A | A |
| (b) Preservability | A | A | A | A |
| (c) Water resistance | A | A | A | A |
| (d) Finger-abrasion resistance | A | A | A | A |
| (e) Light resistance | A | A | A | A |
| (f) Blur | A | A | A | A |
| (g) Optical density | 1.32 | 1.37 | 1.35 | 1.40 |
| (h) Rapid drying property | A | A | A | A |
| (i) Unevenness | B | B | B | B |
| (j) Intermittent Jetting Stability | A | A | A | A |

| Example | 5 | 6 | 7 | 8 |
| --- | --- | --- | --- | --- |
| Resin component of resin emulsion: Component (b) | 9.4 | 2.5 | 34.4 | 4.44 |
| Pigment: Resin component of resin emulsion 1 | 0.3 | 0.67 | 0.18 | 0.28 |
| Component (b): Pigment + Resin component of resin emulsion | 0.463 | 1 | 0.189 | 1.03 |
| (a) Obstruction | A | A | A | A |
| (b) Preservability | A | A | A | A |
| (c) Water resistance | A | A | A | A |
| (d) Finger-abrasion resistance | A | A | A | A |
| (e) Light resistance | A | A | A | A |
| (f) Blur | A | A | A | A |
| (g) Optical density | 1.41 | 1.44 | 1.43 | 1.46 |
| (h) Rapid drying property | | | | |
| (i) Unevenness | A | A | A | B |
| (j) Intermittent Jetting Stability | B | B | B | A |

| Example | 9 | 10 | 11 | 12 | 13 |
| --- | --- | --- | --- | --- | --- |
| Resin component of resin emulsion: Component (b) | 10 | 1.875 | 20 | 0.5 | 5 |
| Pigment: Resin component of resin emulsion 1 | 0.16 | 0.4 | 0.25 | 1.5 | 0.67 |
| Component (b): Pigment + Resin component of resin emulsion | 0.725 | 1.87 | 0.25 | 3.33 | 0.5 |
| (a) Obstruction | A | A | A | A | A |
| (b) Preservability | A | A | A | A | A |
| (c) Water resistance | A | A | A | A | A |
| (d) Finger-abrasion resistance | A | A | A | A | A |
| (e) Light resistance | A | A | A | A | A |
| (f) Blur | A | A | A | A | A |
| (g) Optical density | — | — | — | — | — |
| (h) Rapid drying property | A | A | A | A | A |
| (i) Unevenness | A | A | A | B | A |
| (j) Intermittent Jetting Stability | B | B | A | A | A |

| Example | 14 | 15 | 16 | 17 | 18 |
| --- | --- | --- | --- | --- | --- |
| Resin component of resin emulsion: Component (b) | 2.4 | 10 | 1.33 | 0.67 | 31.7 |
| Pigment: Resin component of resin emulsion 1 | 0.25 | 0.06 | 0.75 | 1 | 0.06 |
| Component (b): Pigment + Resin component of resin emulsion | 2.08 | 1.77 | 1.75 | 3.00 | 0.56 |
| (a) Obstruction | A | A | A | A | A |
| (b) Preservability | A | A | A | A | A |
| (c) Water resistance | A | A | A | A | A |
| (d) Finger-abrasion resistance | A | A | A | A | A |
| (e) Light resistance | A | A | A | A | A |
| (f) Blur | A | A | A | A | A |
| (g) Optical density | 1.40 | 1.59 | 1.44 | 1.41 | 1.59 |
| (h) Rapid drying property | A | A | A | A | A |
| (i) Unevenness | B | B | A | B | B |

TABLE-continued

| | | | | | |
|---|---|---|---|---|---|
| (j) Intermittent Jetting Stability | A | A | A | A | B |

| Example | 19 | 20 | 21 |
|---|---|---|---|
| Resin component of resin emulsion: Component (b) | 0.5 | 20 | 3.82 |
| Pigment: Resin component of resin emulsion 1 | 0.67 | 0.15 | 0.28 |
| Component (b): Pigment + Resin component of resin emulsion | 5.06 | 0.38 | 1.21 |
| (a) Obstruction | A | A | A |
| (b) Preservability | A | A | A |
| (c) Water resistance | — | — | — |
| (d) Finger-abrasion resistance | — | — | — |
| (e) Light resistance | — | — | — |
| (f) Blue | A | A | A |
| (g) Optical density | 1.42 | 1.45 | 1.42 |
| (h) Rapid drying property | — | — | — |
| (i) Unevenness | B | A | A |
| (j) Intermittent Jetting Stability | B | A | A |

| Example | 22 | 23 | 24 |
|---|---|---|---|
| Resin component of resin emulsion: Component (b) | 4.6 | 4.6 | 5.8 |
| Pigment: Resin component of resin emulsion 1 | 0.30 | 0.25 | 0.24 |
| Component (b): Pigment + Resin component of resin emulsion | 0.93 | 1.07 | 1.24 |
| (a) Obstruction | A | A | A |
| (b) Preservability | A | A | A |
| (c) Water resistance | A | A | A |
| (d) Finger-abrasion resistance | A | A | A |
| (e) Light resistance | A | A | A |
| (f) Blur | A | A | A |
| (g) Optical density | 1.42 | 1.41 | 1.40 |
| (h) Rapid drying property | A | A | A |
| (i) Unevenness | A | A | A |
| (j) Intermittent Jetting Stability | AA | AA | A |

| Example | 25 | 26 |
|---|---|---|
| Resin component of resin emulsion: Component (b) | 4.2 | 4.6 |
| Pigment: Resin component of resin emulsion 1 | 0.24 | 0.30 |
| Component (b): Pigment + Resin component of resin emulsion | 1.24 | 0.93 |
| (a) Obstruction | A | A |
| (b) Preservability | A | A |
| (c) Water resistance | A | A |
| (d) Finger-abrasion resistance | A | A |
| (e) Light resistance | A | A |
| (f) Blur | A | A |
| (g) Optical density | 1.42 | 1.58 |
| (h) Rapid drying property | A | A |
| (i) Unevenness | A | A |
| (j) Intermittent Jetting Stability | AA | B |

| Comparative Example | 1 | 2 | 3 |
|---|---|---|---|
| Resin component of resin emulsion: Component (b) | —*1 | —*2 | —*2 |
| Pigment: Resin component of resin emulsion 1 | —*1 | 1.04 | 1 |
| Component (b): Pigment + Resin component of resin emulsion | 0.7 | —*2 | —*2 |
| (a) Obstruction | A | C | C |
| (b) Preservability | A | A | C |
| (c) Water resistance | C | A | — |
| (d) Finger-abrasion resistance | C | A | — |
| (e) Light resistance | A | A | — |
| (f) Blue | B | B | B |
| (g) Optical density | 1.17 | 1.31 | 1.26 |
| (h) Rapid drying property | C | C | — |
| (i) Unevenness | C | C | C |
| (j) Intermittent Jetting Stability | D | D | D |

*1: the resin emulsion waas not contained, and
*2: the component (b) was not contained.

What is claimed is:

1. An aqueous ink composition for ink jet printing comprising:
   (a) a color pigment,
   (b) a component selected from the group consisting of saccharides, derivatives thereof and polyols having 5 or more hydroxyl groups, and
   (c) a resin emulsion.

2. An ink composition according to claim 1, wherein the saccharides as the component (b) are selected from the group consisting of monosaccharides, disaccharides, oligosaccharides and polysaccharides.

3. An ink composition according to claim 1, wherein the derivatives of the saccharides as the component (b) are reducing sugars, oxidized sugars, dehydrated sugar derivatives, amino sugars or thiosugars of the saccharides.

4. An ink composition according to claim 1, wherein the polyol as the component (b) is inositol.

5. An ink composition according to claim 1, wherein the resin emulsion has a minimum film-forming temperature of 50° C. or more.

6. An ink composition according to claim 1, wherein the resin emulsion is selected from the group consisting of acrylic resin emulsions, vinyl acetate resin emulsion, vinyl chloride resin emulsions, acryl-styrene resin emulsions polybutadiene resin emulsions and stylene resin emulsions.

7. An ink composition according to claim 1, wherein the weight ratio of a resin component of the resin emulsion: the component (b) is from 1:0.5 or more but less than 1:50.

8. An ink composition according to claim 1, wherein the weight ratio of the pigment: a resin component of the resin emulsion is from 1:0.1 to 1:2, and the weight ratio of the component (b): the total amount of the pigment and the resin component of the resin emulsion is from 1:0.1 to 1:2.

9. An ink composition according to claim 1, wherein a resin component of the resin emulsion is present in an amount of from 0.1 to 40% by weight based on the ink composition.

10. An ink composition according to claim 1, wherein the component (b) is present in an amount of from 0.1 to 40% by weight based on the ink composition.

11. An ink composition according to claim 1, further comprising a wetting agent.

12. An ink composition according to claim 11, further comprising an organic solvent having a low boiling point.

13. An ink composition according to claim 1, wherein the component (a) is a pigment dispersion obtained by dispersing a pigment in a solvent using a dispersant.

14. An ink composition according to claim 13, wherein the weight ratio of the total amount of the pigment and the resin component of the resin emulsion: the dispersant is from 1:0.02 to 1:0.5, and the weight ratio of the dispersant: the component (b) is from 1:0.5 to 1:50.

15. An ink composition according to claim 13, wherein the pigment dispersion further comprises an amine.

16. An ink composition according to claim 1, wherein the component (a) is an organic pigment.

17. An ink composition according to claim 11, wherein the wetting agent is urea.

18. An ink composition according to claim 11, wherein the wetting agent is 2-pyrrolidone.

19. An ink composition according to claim 11, wherein the wetting agent is a mixture of urea and 2-pyrrolidone.

20. An aqueous ink composition for ink jet printing comprising:
    (a) a pigment,
    (b) a component selected from the group consisting of saccharides, derivatives thereof and polyols having 5 or more hydroxy groups,
    (c) a resin emulsion, and
    (d) urea as a wetting agent.

21. An aqueous ink composition for ink jet printing comprising:
    (a) a pigment,
    (b) a component selected from the group consisting of saccharides, derivatives thereof and polyols having 5 or more hydroxy groups,
    (c) a resin emulsion, and
    (d) 2-pyrrolidone as a wetting agent.

22. An aqueous ink composition for ink jet printing comprising:
    (a) a pigment,
    (b) a component selected from the group consisting of saccharides, derivatives thereof and polyols having 5 or more hydroxy groups,
    (c) a resin emulsion, and
    (d) a mixture of urea and 2-pyrrolidone as a wetting agent.

23. An aqueous ink composition for ink jet printing comprising:
    (a) a pigment,
    (b) a component selected from the group consisting of saccharides, derivatives thereof and polyols having 5 or more hydroxy groups, and
    (c) a resin emulsion, wherein the resin emulsion has a minimum film-forming temperature of 50° C. Or more, the weight ratio of the pigment: a resin component of the resin emulsion is from 1:0.1 to 1:2, and the weight ratio of the component (b): the total amount of the pigment and the resin component of the resin emulsion is from 1:0.1 to 1:2.

24. An ink composition according to claim 23, further comprising a wetting agent.

25. An ink composition according to claim 24, wherein the wetting agent is urea.

26. An ink composition according to claim 24, wherein the wetting agent is 2-pyrrolidone.

27. An ink composition according to claim 24, wherein the wetting agent is a mixture of urea and 2-pyrrolidone.

* * * * *

UNITED STATES PATENT AND TRADEMARK OFFICE
CERTIFICATE OF CORRECTION

PATENT NO. : 5,503,664
DATED : April 2, 1996
INVENTOR(S) : Yukari Sano et al.

It is certified that error appears in the above-indentified patent and that said Letters Patent is hereby corrected as shown below:

On the title page, after Date of Patent: "April 2, 1996" add an asterisk -- * --, after item [73], insert the following: -- The portion of the term after May 19, 2013, has been disclaimed. --

Signed and Sealed this

Thirteenth Day of May, 1997

Attest:

BRUCE LEHMAN

Attesting Officer

Commissioner of Patents and Trademarks